Oct. 18, 1966 J. W. NELSON 3,280,296
WELDING METHOD
Filed Oct. 8, 1964

INVENTOR: JEROME W. NELSON
BY Edwin M. Thomas ATTORNEY 3,280,296
WELDING METHOD
Jerome W. Nelson, Arlington, Ohio, assignor, by mesne assignments, to Esso Research and Engineering Company, Elizabeth, N.J., a corporation of Delaware
Filed Oct. 8, 1964, Ser. No. 402,401
10 Claims. (Cl. 219—137)

The present invention relates to an improved welding system. A preferred application relates to a process and apparatus for welding tubular metal objects or parts together, such as pipe joints in a pipeline but the invention is not limited thereto.

According to the present invention, important benefits in electric arc welding are derived by employing a power source which produces substantially constant or well controlled current. This current is kept under control while maintaining a less rigorous control of voltage but still keeping the voltage fluctuations within definite limits. For brevity, this system may be called a gated voltage constant current system or "GVCC." The current is kept constant within relatively narrow limits and this is accomplished, in part at least, by varying the voltage. However, voltage is not allowed to pass outside the "gated" range. By means of the system of the present invention, voltage-current control is maintained in such a way as to confer distinct advantages on arc welding procedures of various kinds. Specific procedures for maintaining the necessary controls and specific welding processes taking advantage thereof will be set forth hereinafter.

In U.S. Patent No. 3,084,246 there is disclosed a process and an apparatus for welding structures such as pipelines, etc. The present invention is concerned with improvements in such process and apparatus. It is not necessarily limited, however, to the welding of pipelines or analogous structures, although such applications constitute one important application. The present invention is especially applicable to processes of welding using a fine wire electrode. By "fine wire" is meant electrode smaller than about 3/32" diameter.

As further disclosed in the aforesaid patent and in other patents relating to the same general process, such as Patent No. 3,084,244, a successful fine wire welding procedure has been devised in the past. For pipeline welding the consecutive lengths of pipe which are to be joined by a girth weld to form a continuous structure are first brought together in juxtaposed end-to-end position. Thereafter, certain preparatory operations are performed on or with respect to the adjacent pipe end surfaces. The welding then is carried out by moving a welding unit progressively in a circular path around the pipe, or relatively to the pipe surface, since the pipe in some cases may be rotated. In the presently preferred procedure, a spaced "joint" or kerf of rather precise dimensions is first prepared between the adjoining pipe sections, either by accurately spacing the adjacent pipe ends a few thousandths or hundredths of an inch apart to form the gap or space, or by removing material from one or both end surfaces, e.g., by grinding cutting, etc., to obtain uniform gap dimensions. Thereafter, and preferably with a welding head closely associated with the joint preparation means, the weld is formed by progressively introducing an electrode filler material into the gap and fusing the filler material by means of an electric arc while the weld is formed progressively around the joint.

The preliminary operations mentioned above commonly involve a grinding or cutting of one or both of the end surfaces of the pipe or pipes to remove irregularities therefrom. This is done simply to obtain a gap or space of uniform width between the pipe sections. This grinding or cutting preferably is done in such a manner as to leave a relatively narrow perpendicular wall gap of uniform width. The gap extends completely through the pipe wall thickness and is destined to be filled with the welding material.

The latter is applied so as to fuse soundly to the pipes or work pieces. The cutting or grinding operation thus carried out to prepare the joint surfaces may be performed by various means. For example, a thin abrasive wheel may be used, rotating at high speed while being traversed around the pipe joint. Meanwhile the adjacent pipe ends are tightly clamped to prevent inadvertent movement and to keep them precisely in proper position during the preparatory and welding operations. Alternatively, a suitable cutter, rather than a grinding device, may be used to form the gap or kerf. A suitable cutter is a thin milling cutter rotated at suitable speed and traversed around the circumference of the pipe at the joint. In some cases a saw may be used. By taking care, when pipe is available having smooth, accurately formed perpendicular end faces the joint may be precisely aligned and spaced with the required accuracy without any cutting or grinding. This is possible when both of the two adjacent pipe ends have unmarred and smooth, uniform and perpendicular end surfaces. The establishment of uniform and suitably spaced end surfaces, whether accomplished by cutting, grinding, or spacing, etc., or a combination of such procedures, is referred to hereinafter as preparation of the joint. It puts the adjacent end surfaces in proper position and condition for welding. The reasons for requiring gap uniformity, etc., are discussed in some additional detail in the patents mentioned above.

For convenience, the various factors that influence the quality of the weld ultimately produced may be referred to hereinafter as parameters. As will appear more fully presently, there are quite a number of such parameters. Some of them have more influence on success of the process than others. In general, these parameters are variables most of which can, at least in theory, and usually in practice, be independently adjusted and brought to a desired value by taking suitable care. The major parameters in fine wire welding are listed as follows:

(1) Design of the welding joint per se, i.e., cross-sectional form, dimensions, etc.
(2) The gap width or spacing between adjacent members at the joint.
(3) The nature or composition and the flow rate of the shielding medium used around the joint while it is being welded.
(4) Composition and structures of the electrode filler material (preferably a slender wire type electrode), together with the composition and nature of its surface coating if such a coating is employed.
(5) Diameter of the filler electrode or wire.
(6) Travel speed of the welding head with respect to the work surface at the welded joint.
(7) Speed of electrode or filler wire feed or advancement towards the work.
(8) Welding barrel angle (the angle at which the welding wire or electrode enters the joint).
(9) The distance between the contact tube and the work (CTWD or "stick out").
(10) The voltage between electrode (or welding head) and the joint. Such voltage, as generally stated herein, includes the voltage drop in the electrode wire itself. Voltage, in the sense here used, may refer to a single instantaneous voltage or to a voltage program. For example, in welding a pipe line where the welding head is traversed around the joint, the pipe being held in a fixed position, a relatively high voltage may be required in some positions, e.g., in the "flat" position (at the top of the pipe) whereas lower voltage may be required in other places, e.g., in the "vertical" position (at the side of the pipe).

(11) The rigidity or firmness with which the parts being welded are or can be held during the operation. (The welding operation tends to cause shrinkage and distortion of the gap as the hot metal cools.)

(12) The dynamic response of the welding power supply source as the arc is formed and continued.

(13) The temperature conditions, e.g., degree of preheat of materials being welded and ambient conditions, particularly if a preheat for the work is used.

(14) The nature, e.g., dimensions, location, spacing, heat conductive properties, etc., of a weld backup structure, if such is used.

(15) The position of the filler wire or electrode as it is fed into the joint or between the spaced work parts, and the frequency and nature of variations in such position.

As set forth in some detail in the aforesaid patent, the rapid and automatic welding of metal structures, particularly of steel or ferrous metal tubular structures, involves a large number of variables. Many such variables are named and discussed in Patent No. 3,084,246. However, there are some additional factors which are of importance in the present case and the most significant of such variables will be discussed briefly herein.

For example, in welding sections of tubular pipe together to form a pipeline in the field, it is usually necessary to form a girth weld around each joint without being able to rotate the pipe. In certain preliminary operations sometimes practiced in the field, a procedure known as double jointing may be followed. In double jointing two sections of pipe are assembled and welded together in end to end relation to form a butt joint. This may be done by rotating the two pipe sections under a stationary or relatively stationary welding head. In some aspects, the present invention is applicable also to such a double jointing procedure. The more complex welding problems arise, however, when the pipes to be welded are in non-rotatable or so-called "fixed position." The present invention has particular advantages in fixed position welding of such structures. Obviously, when a pipeline is built in the field by adding consecutive joints or lengths of pipe to a line already partially constructed, and often partly or largely buried in the earth, it is not possible to rotate such pipe under the welding head. Instead, welding must be carried out by progressive action around the joint.

In typical pipeline welding as practiced according to the teachings of the patents mentioned above, the parameters or variables 1 to 12 and 15 enumerated above generally apply. Parameters 13 and 14 may apply less generally, sometimes, in special cases.

If all the parameters listed above, or all such as are applicable, can be well controlled, excellent welds generally can be produced automatically without employment of the present system. Under such conditions a substantially continuous welding arc may be produced and, under proper control, the resulting weld is of uniform and superior quality.

Uncontrolled variations in one or more of the parameters may give rise to difficulties and can produce defects, which are normally accompanied by larger than normal current fluctuations. An important object of the present invention, therefore, is to minimize or eliminate some of the effects of uncontrolled variations of the more important variables which cause trouble or defective welds, particularly those which cause substantial variation in welding current.

According to the present invention, assuming that reasonable control over other parameters is possible, a very close control of the welding current to keep it at or near to a steady value (except for minor instantaneous variations which are largely self correcting) is accomplished with only limited variation in voltage. The desired control of electric current may be within 1% or less of mean value, while limiting the voltage swing to variations of the general order of ±10 to 12%. A particular object of this voltage and current control or GVCC is to maintain good control of weld penetration.

In the past, as noted in Patent No. 3,084,246, it was considered quite important, and in some cases essential, to maintain a fairly constant voltage or potential on the electric arc during the welding process. Some voltage control is still essential. However, according to the present invention, while it is still necessary to keep the voltage within limits, it is even more important and beneficial to control the current so as to keep it within relatively much narrower limits. As a matter of fact, some moderate variations, in voltage, e.g., of the order of ±10% in many cases, may be useful or desirable to obtain high quality welds provided that current fluctuation is kept within much narrower limits, e.g., ±1 tor 2%. Thus, in starting the welding, slightly higher voltage may be required than at certain later stages during the welding operation, but this is not true of the current.

In obtaining a sound weld between two adjacent structures, such as lengths of pipe, it is highly important that the weld penetrate through the full thickness of the work to the base or root of the joint. That is, a strong weld requires that a sound weld structure be formed at the very inner surface of the pipe in the case of a pipe line girth weld. It must, of course, extend through the full pipe wall thickness too. When welding is accomplished, according to the preferred procedure of the present invention, by feeding an electrode wire at a controlled and predetermined rate into the narrow gap, it is essential that the penetration of the electrode into such gap be right. That is, the depth at which burning off of the electrode and fusion of the electrode material with the abutting work pieces at the joint takes place, must be kept at such a level that a sound "root" weld is produced.

This control of penetration is an extremely important factor in obtaining good welded joints. It is important not only in welding girth joints in tubular structures, such as pipe lines, but also in welding other structures as well. In some aspects, this invention is applicable to many other structures and joint constructions as will be pointed out below. The penetration ordinarily obtained tends to vary somewhat with the instantaneous position of the welding head around the joint, in the case where a welding head is traversed around a pipe line. Thus, other things being kept constant, in welding a pipe line joint penetration generally will be different at the top than at the sides or the bottom of the pipe. This is due partly to gravity and its effect on the molten material of the weld pool and partly to the force of the arc itself. The arc has a dynamic force which tends to push mobile material such as molten metal into locations which may vary from point to point as one progresses around a circumference of an annular joint in a more or less vertical plane.

Of the parameters listed above, fortunately those most difficult to control directly can be indirectly corrected for and may be called self-correcting or positive parameters. With respect to penetration, a positive parameter or variable may be one which, upon changing in value, tends to cause the signal parameter, namely the welding current, to change inversely with the depth of penetration of the weld into the joint.

For example, one positive parameter is gap width. If gap width increases the penetration tends to increase because the wire does not burn off as rapidly. This causes current to decrease. Current is the independent variable her and is used in this case as a signal parameter. Voltage, another positive parameter, is controlled and thus becomes a dependent variable in this case. When voltage is increased to reverse the incipient decrease in current this will bring the wire penetration back to the desired value.

Conversely, a negative parameter or variable is one which, upon variation, causes other variables to change so as to contribute to instability of operation. With respect to penetration, a negative parameter is one which, upon variation, causes the current to change directly with the depth of penetration.

An example of a negative parameter is wire feed speed. If wire feed speed is allowed to increase, penetration will increase and the current increases too (gap width remaining constant). Reducing the voltage will correct the current but it also causes the wire to penetrate farther because less electrode is melted. In other words, the over penetration becomes worse than if no voltage correction had been made at all. Hence it is particularly important, with the control system of this invention, that negative parameters, in this case wire feed rate, be carefully controlled and stabilized so that uncontrolled variations of this particular parameter or variable do not cause instability. This is another important aspect of the invention.

In welding pipe lines in the non-rotatable or so-called fixed position, as discussed above, certain conditions or variables must be adjusted and developed so as to tolerate the irregularities in certain other variables or conditions which cannot be avoided in practice. Examples of the latter are variations in chemical composition of the material of the pipe itself, conditions or ingredients which may affect fluidity, or materials which affect the surface tension of molten welding material or which may change the metal fusion temperature range. Variations in wall thickness around the perimeters of pipe joints are frequently encountered and these give rise to obvious problems. Variations in the effect of gravity at various positions around a pipe joint periphery (for a joint more or less in a vertical plane) cause further problems, as already noted.

Fortunately, most of the variables or parameters which normally cannot be controlled completely, such as variations in the specific composition of the material being welded and structural differences from point to point therein, and variations due to changes in the instantaneous weld position are usually positive parameters in the present process. This is true, also, of certain other conditions or variables which are difficult to control.

In essence the process of the present invention, as applied to pipeline welding involves the following steps:

(1) Prepare the joint to obtain a uniform gap between adjacent work pieces.

(2) Feed a consumable electrode at a uniform rate into the joint to an intermediate point in the joint.

(3) Maintain an inert shielding gas blanket around the welding to prevent oxidation, etc.

(4) Apply a reasonably uniform welding voltage ($\pm 10\%$) between the work and the electrode to establish an arc and to burn off the electrode at the desired intermediate depth.

(5) Maintain a substantially constant current (preferably within $\pm 1\%$) to control the burn-off point of the electrode material.

Because of the voltage-current relationship, the operation is referred to for convenience as a gated-voltage constant-current (GVCC) procedure.

The foregoing steps are preferably accompanied by the following additional control measures:

A. Maintain a reasonably uniform welding gap.

B. Maintain a constant flow of shielding gas around the arc.

C. Maintain a predetermined spatial relationship between the welding head and the work. Some variation may be permissible at the start and stop of an operation.

D. Move the welding head with respect to the work at a constant rate. Here again variations may be permissible at the start or finish of an operation for better control.

E. Maintain a constant composition in welding material and, as far as possible, in the work pieces.

F. Establish uniform dimensions, temperature conditions and heat flow rates in the work pieces, as far as practicable.

The gated-voltage constant-current system of the present invention tends automatically to compensate for and correct variations in the positive parameters such as:

(a) Gap width
(b) Weld pool fluidity
(c) Arc crowding (variations due to change of welding position).

In order to use the GVCC system, close control must be maintained at all times over the negative parameters such as:

(a) Wire feed speed
(b) CTWD (distance from the contact tube to the work).

However, the prior process, as described in the patents mentioned above has also required this same close control.

The current and its fluctuations are good indicators of the burn-off point or penetration when other parameters remain constant. The reason for this is that with fine wire welding (circa $\frac{1}{16}$ inch or less) two main and different methods of wire melting are involved. One of these is the thermal melting due to the arc itself and the other is the $I^2R$ or resistance heating effect of the electric current flowing through the electrode. It appears that the resistance heating is more efficient than the arc heating and hence should be favored. Obviously, with a change to a lower burn-off point (greater length of protruding wire) current will decrease if voltage is held constant and resistance heating decreases even more. In a constant current system, this does not occur. That part of the voltage which maintains current in the wire must then increase at the expense of voltage across the arc. This decrease in arc voltage tends to increase the penetration but the resulting IR increase in the wire stabilizes penetration. The resulting change in current is inversely related to penetration, which also is a stabilizing factor.

Obviously, the foregoing steps and controls are generally interrelated and variations in one or more may often be compensated for by intentionally varying and adjusting other factors. Of particular importance is the relationship between welding current, the burn-off point or penetration of the wire into the gap, and the deposition rate of the electrode, and feed-in rate of the electrode material. Since rapid and wide voltage changes cause upsets in the molten welding pool, these must be avoided or at least retarded.

It is a particular object of the present invention to establish and maintain the essential interrelations between the voltage and the current of the electric arc, as well as relations between the other parameters that affect weld quality.

A more particular object is to control the welding current within narrow limits while permitting relatively wider variations in applied voltage. This includes intentional variations in applied voltage with accompanying automatic control of current at the arc.

At the same time, it is not desirable to make corrections in current fluctuations in current too quickly, especially by sudden voltage changes, because such corrections affect the stability of the weld pool and hence tend to produce unstable welding conditions. Therefore, a further object is to include in the control operations a delay measure which prevents premature application of current control or overcorrections in voltage.

From another viewpoint, the process of the present invention may be considered a programmed voltage welding operation to maintain a relatively constant current at the arc. The various voltages selected in the programmed sequence are required to compensate for changes in position parameters. For example, changes in welding position cause changes in so-called "arc-crowding." Arc-crowding is the action of the molten weld pool moving into the arc, e.g., by gravity. This occurs in varying degrees at different positions in forming a girth weld around an annular joint, as in welding fixed-position pipe, such as a pipe line in the field. As the weld progresses from the flat position (at the top of the pipe) around to the vertical (at a side) and then to the overhead position (at the bottom), the effect of arc crowding changes. The weld penetration changes also. When arc crowding is least, e.g., in the flat and overhead positions, the penetration is greatest. At the vertical position where arc crowding is greatest, penetration is least. By increasing the voltage in the flat position, more of the work piece metal, i.e., the pipe in the case of a pipeline, is melted and the filler wire expends itself so that penetration is reduced. By decreasing voltage in the vertical position, the filler wire (electrode) can maintain the desired penetration because less of the base or work-piece metal is melted, due to the shorter arc length.

A particular and further object of the invention is to implement the concept just stated.

A further object, somewhat independent to those mentioned heretofore, is to improve the quality and uniformity of multiple pass welds in relatively thick structures, a particular object being the multiple pass welding of thick walled pipe. This will be explained further.

Further objects will become readily apparent to those skilled in the art, as this description proceeds.

Hence, reference will next be made to the accompanying drawings, wherein.

Figure 1:
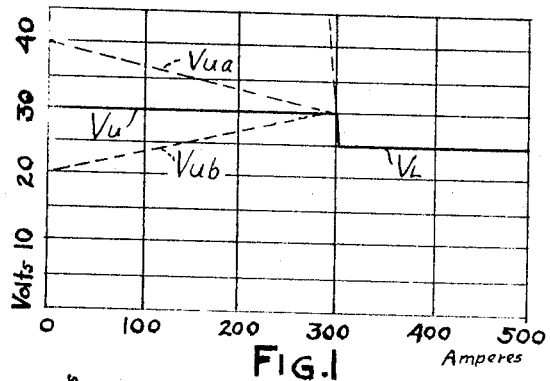
FIG. 1 is a graph showing certain operating characteristics of the present invention with relation to voltage and currently applied to the welding arc.

Referring first to FIG. 1, there is shown graphically a voltage-current system as a basis for discussing current control. As an example, let it be assumed that a desirable welding current is 300 amperes. The solid line $Vu$ represents the normal upper limit of the gated voltage employed while the arc is actually welding. Solid line $V_L$ represents the normal lower limit of the gated voltage. $Icc$ represents the desired constant current which does not change substantially between the upper and lower limits of the normal gated voltage.

Actually, if $Icc$ becomes perfectly vertical, at the control of the rate of change of voltage becomes very critical and may produce instability. It is therefore desirable, usually, that $Icc$ have a slight slope indicated by the angle $\alpha$. This helps to eliminate overcorrection in the control system which will be described below. A preferred control system allows all the values $Vu$, $V_L$, $Icc$ and $\alpha$ and the range of voltage changes, also, to be adjusted within reasonable limits.

A refinement to the normal flat upper and lower voltage limits of the GVCC control system may sometimes be advantageous. For example, for starting and stopping purposes, it is desirable to be able to apply higher and lower voltage values than $Vu$ and $V_L$ respectively. The higher starting voltage, indicated by the dotted line $Vua$, FIG. 1, drops rapidly as current increases and is useful to give a positive start as the arc is first formed. Conversely, the upper voltage limit for stopping, indicated at $Vub$, is designed to obtain a crater filling action at the end of the weld. With the arc buried deeply within the weld, as is the normal case, the voltage normally would tend to rise as the filler wire is stopped and current decreases. Such an operation causes the terminal portion of the weld to flare out widely and thus create a crater. Such a crater is highly objectionable in a finished weld. Moreover, what may be even more objectionable, a sharp increase in voltage (along line $Vua$ for example as current is reduced) can cause the molten weld pool to be blown or forced out of the arc hole. Before it can return, the metal in front of the arc may cool enough that the molten metal does not fuse with it. In such a case a "cold shut" is formed.

By designing the system so that the voltage drops as the current drops (and the current of course drops as the electrode wire feed stops) the arc pocket or crater decreases in size and it can be filled neatly. Such control of voltage allows the molten weld pool to follow the arc out of the hole, filling it completely. This is accomplished with a minimum of unstability. Also, any tendency for the arc to extend up to the contact tube, through which the wire electrode is fed to the weld, is eliminated. This prevents so-called "burn backs" which otherwise might occur.

The desired upper and lower limits $Vu$ and $V_L$ may be determined by experiment or by separate studies. The values selected are such that the desired correction in voltage-current relation will be obtained without instability. The values shown are exemplary but have been found quite suitable for welding steel pipe joints.

In FIG. 1 $Vu$ is indicated as 30 volts and $V_L$ 25 volts. These values are more or less typical for normal steel pipe line welding. $Vu$ is high enough only to limit wire penetration into the narrow gap but overlimiting will cause loss of root fusion. This may occur even at the flat or overhead positions where penetration normally is deepest, other things being equal. As the welding operation starts with a suitable voltage program, however, the voltage is lower at first and this causes penetration to increase to give the highly important root fusion (sound weld at the base of the joint). Voltage corrections take place quickly enough to insure the necessary penetration but not at a rate so high as to cause an instability of the weld pool.

A higher starting voltage, e.g., 40 volts, indicated at the dotted line $Vua$ will also bring about a correction and drop back to a normal value but the forcing function of the arc becomes too great. This often will blow the molten metal out of the joint. Such a condition gives an unable start unless the voltage can quickly be brought to $Vu$ and the current kept stable. Where the angle $\alpha$ closely approaches zero, a very small change in current will demand a maximum voltage change, within the gated limits. Such changes can cause excessive agitation of the molten weld pool. By having a small slope at $\alpha$, e.g., not more than 1 or 2% current change for a 10% voltage change, the voltage fluctuations are kept within reasonable rates of change. Should something occur to cause a large current change, such as burning off the wire electrode or a sudden change in electrode penetration into the gap, the voltage can swing to the maximum (or minimum) gated value and bring about the needed correction without instability.

Figure 2:
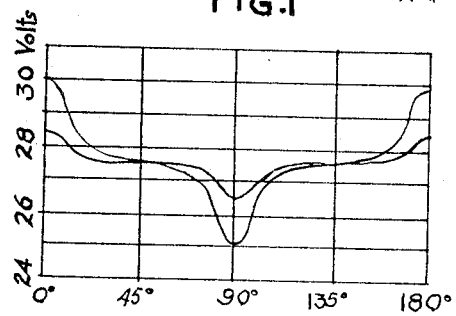
FIG. 2 is a graphical representation of a typical voltage program for welding a pipe joint in a fixed position pipe line.

Conversely, where penetration normally is least, a moderate reduction in voltage will correct it. For example, in the vertical or 3 o'clock position at the side of a pipe joint voltage should be reduced. FIG. 2 suggests a lower voltage value 19 of 25 volts but this value generally will be maintained only for a very short time period. As soon as current is started, and the arc is established the voltage rises to its normal or new stable value. If the lower voltage value were not gated or limited, as would be the case with a constant current generator, the forcing function could be too violent, causing a loss of the arc. This would result in instability. Here again, too extreme changes in voltage due to minor fluctuations in current can cause instability. The angle $\alpha$ should not be too close to zero. Experience shows that by gating the voltage between about 25 and 30 volts and maintaining current constant within about ±1% gives very satisfactory and stable performance. Variations of up to ±2% in current usually can be tolerated but closer control is preferable for high stability.

In designing the control system, a desired mean value of current is selected, say 300 amperes. It will be understood that this figure may be varied considerably. In some cases, the current selected need not be the mean current, e.g., when a correcting means operates more effectively in one direction than the other. In some cases pronounced and undesirable changes in arc characteristics occur as voltage is lowered and the selected or mean value should not be too close to such transition points.

The current then is selected at a constant or substantially constant potential, i.e., without special regulation. Before current and potential are tentatively established, the other parameters named above, such as electrode wire size and type, electrode feed rate, rate of progressing around the joint, etc., are selected or determined. These selections are made as if a regular constant potential generator were to be used, using the general procedure described in the patents heretofore mentioned. Then, after the desired current is determined, the limiting or gated values of the voltage to be applied at the arc are determined.

The selected GVCC control regulator is next set and adjusted to keep the current value, the slope $\alpha$, and the voltage limits all within the desired bounds. Thereafter, with a few practice welds, refinements in adjustments can be made and the system is placed in operation.

The particular mechanisms for regulating the current within the limits of the gated voltage form the subject matter of a separate application and are not described in detail herein.

Figure 3:
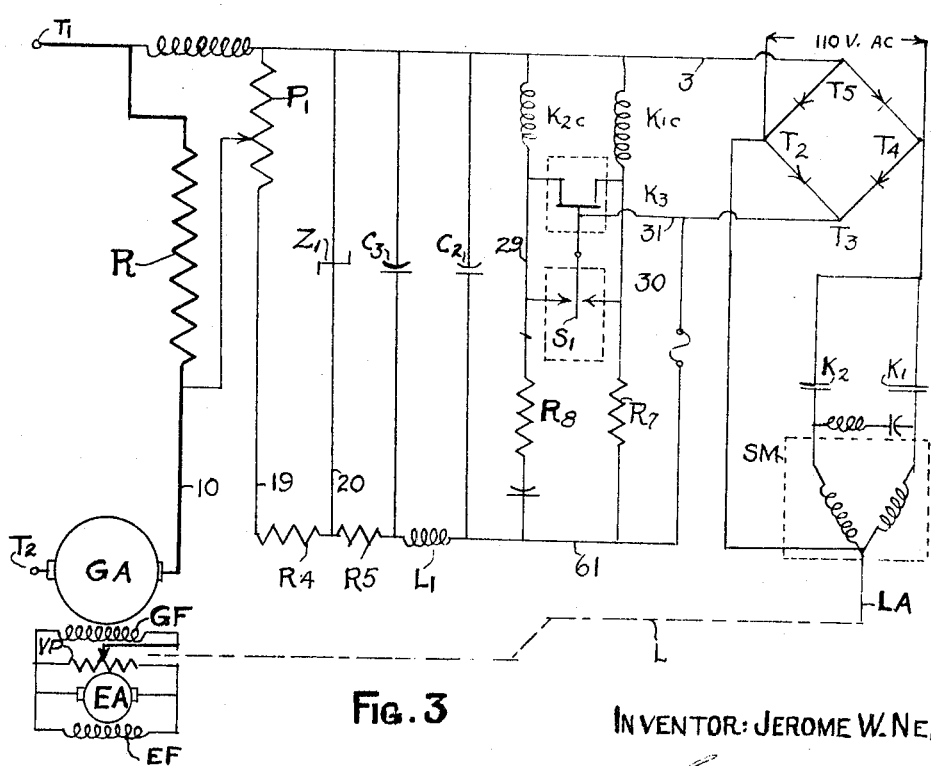
FIG. 3 is a wiring diagram for a GVCC control system.

Referring now to FIGURE 3, there is shown a system for establishing the gated voltage constant current control previously described. It will be understood that the current is not absolutely constant but varies only enough to give $\alpha$ a sufficient slope or value to maintain stability at the arc in spite of small variations in such parameters as pipe wall thickness, pipe composition, wire feed rate, rate of advance of the welding head, CTWD, etc. In general, although a limit of $\pm 2\%$, and preferably about $\pm 1\%$ variation is permissible in current with voltage gated at $\pm 10\%$, it is desirable to keep current fluctuations even smaller, i.e., $\frac{1}{2}\%$ or less. In a typical situation, welding large diameter (30-, 36- or 42-inch pipe) with a wall thickness of $\frac{1}{2}$ inch, the voltage will be gated between 25 and 30 volts and the current at 300 amperes, $\pm 5$ to 6 but preferably $\pm 1$ to 3 amperes. These conditions are not generally attainable with commercial equipment of which applicants are aware. The system shown in FIG. 3 is an example of one which can be used but the equipment shown therein is only illustrative and does not constitute a part of this invention.

Referring now to FIG. 3, GA is the armature of the D.C. generator that supplies the welding power. It will be understood that this armature is driven by any suitable power source. In field operations, an internal combustion engine, preferably of diesel type for a large installation, will commonly be used. The field coil is supplied with current from an exciter having armature EA and field EF. The current so supplied to the generator field GF is regulated, however, so that constant current will be provided by the generator armature GA even though the output voltage of GA varies as much as $\pm 10\%$ or more.

The system illustrated in FIG. 3 is suitable for explaining the method of operation and will be described in some detail but it is to be understood that so far as control apparatus is concerned, this is only exemplary.

By means of a variable potentiometer VP, the generator field current, which is in series with the exciter armature EA, can be adjusted by moving lever L around the variable resistor element. The output leads $T_1$ and $T_2$ from the generator armature GA will be connected to the welder, not shown.

The main line 10 from the generator armature to the welder contains a small resistance which normally produces a small voltage drop under usual operation conditions. Shunted across this resistance is a line 19 which includes a variable potentiometer $P_2$. By varying the setting of $P_2$ a suitable voltage can be transmitted to a line 20 to balance a standard voltage established by a Zener diode $Z_1$. A resistor $R_4$ connects the diode $Z_1$ to line 20 and line 20 also includes the coil $K_{3c}$ of a current sensitive relay. In other words, coil $K_{3c}$ is in an error circuit. When no current flows in $K_{3c}$, no corrective action need be taken. If current increases in line 10, it will cause a current to flow through $K_{3c}$ in one direction and a decrease of current in line 10 will cause current to flow in the other direction through coil $K_{3c}$. Depending on direction of current, coil $K_{3c}$ will close one or the other of a pair of contacts $K_3$. Thereupon, current will flow through either relay coil $K_{1c}$ or $K_{2c}$, in lines 30 or 29, respectively, to a terminal $T_3$ of a bridge rectifier BR. Contacts $K_1$ or else $K_2$ will be closed.

Closing either pair of contacts, $K_1$ or $K_2$ will cause current from a conventional source, e.g., a 110 v. A.C. source to flow through a slow moving synchronous motor SM in one direction or the other. Motor SM moves a lever arm LA which is connected mechanically to the potentiometer VP, i.e., to lever L. Depending on direction of movement, this will increase or decrease the voltage in generator field GF.

Capacitors $C_2$ and $C_3$ and resistors $R_5$, $R_7$ and $R_8$, with coil L, serve to balance out the system so that no current flows through $K_{3c}$ under steady conditions, assuming that the potentiometer $P_2$ has been set at a correct value for the steady current desired. It is assumed, of course, that the prime movers (not shown) for generator armature GA has sufficient power and flexibility to take up the extra load which may be imposed if a moderate voltage rise in the output line becomes necessary to keep the current at its steady value. Such a condition might arise, for example, when electrode penetration into the welding gap changes or whenever high resistance in the welding arc is encountered.

Contacts $K_1$ and $K_2$ are microposition switches operated respectively by coils $K_{1c}$ and $K_{2c}$. Alternating current is applied to the diagonally opposite terminals $T_4$ and $T_6$ of bridge rectifier BR which is of conventional type. The other terminal $T_5$ of the rectifier is connected to the main line terminal $T_2$ through line 3 which is also connected to the terminals of the relay coils $K_{1c}$, $K_{2c}$, $K_{3c}$, to the Zener diode, and to capacitors $C_2$ and $C_3$ as well as line 19.

The operation of bridge rectifier BR and of the slow synchronous motor are well known and will not be described in detail. A commercial motor "slosyn" is quite suitable for the purpose.

It will be understood that various types of equipment can be used and that various kinds of welding operations can be performed according to the present invention. For example, deep multi-pass welds in thick materials such as heavy plates, in butt joint or even in T-joint, as well as operation in thinner plates and pipe lines can be carried out.

What is claimed is:

1. The process of welding work piece elements together with a consumable electrode which comprises the steps of applying a programmed voltage between the electrode and the work elements to establish an electric arc and supplying a substantially constant electric current to said gap.

2. Process according to claim 1 wherein the voltage is permitted to vary up to a maximum and a minimum of $\pm 10\%$ from a nominal voltage whereas the current is held to narrower percentage variations from nominal.

3. Process according to claim 1 wherein the current is held constant within $\pm 2\%$ of a desired steady value.

4. Process according to claim 1 wherein the current is held within $\pm 1\%$ of a desired steady value.

5. Process of claim 1 wherein the programmed voltage is intentionally varied to compensate for changes in welding position or condition while the current is held substantially constant.

6. Process of claim 5 wherein minor variations of current are permitted along with wider variations in voltage, by introducing an intentional delay in the correction of current variations.

7. The process of producing a weld between adjacent aligned metal elements separated by a gap and having a continually changing orientation with respect to gravity, which comprises with an electrode applying an arc-establishing voltage between said electrode and said metal elements, controlling the current supplied to the arc to keep it substantially uniform within narrow limits, and intentionally varying the applied voltage through a programmed predetermined value range related to the gravity orientation of said weld to maintain an effective welding arc and substantially uniform penetration throughout the length of the weld.

8. Process according to claim 7 wherein voltage variations are held within outer limits of about ±12% of mean value.

9. Process according to claim 7 wherein variations of current are held within about 2% of a predetermined steady value.

10. The method of controlling weld penetration or the electrode burn-off point within predetermined limits in fine wire electric arc welding comprising the step of controlling the current supplied to the arc to keep it substantially uniform and within narrow current limits, said step of controlling including maintaining the applied voltage between predetermined voltage limits, and intentionally varying the applied voltage through a programmed predetermined range of limits related to the orientation of said weld with respect to gravity to obtain uniform penetration throughout the length of said weld.

References Cited by the Examiner

UNITED STATES PATENTS

| | | | |
|---|---|---|---|
| 2,200,632 | 5/1940 | Mills | 219—131 X |
| 2,332,950 | 10/1943 | Tannheim | 219—137 |
| 2,444,834 | 7/1948 | Landis | 219—73 |
| 3,084,244 | 4/1963 | Rieppell et al. | 219—60 |
| 3,084,246 | 4/1963 | Rieppell et al. | 219—125 |

RICHARD M. WOOD, *Primary Examiner.*